United States Patent
Ma et al.

(10) Patent No.: US 6,801,486 B2
(45) Date of Patent: Oct. 5, 2004

(54) METHOD AND APPARATUS TO GENERATE A MONITORING SIGNAL FOR AN OPTICAL RECORDING/REPRODUCING SYSTEM

(75) Inventors: Byung-in Ma, Gyeonggi-do (KR);
In-sik Park, Gyeonggi-do (KR);
Tae-yong Doh, Gyeonggi-do (KR);
Jin-hoon Jeon, Gyeonggi-do (KR);
Byoung-ho Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 492 days.

(21) Appl. No.: 09/993,911

(22) Filed: Nov. 27, 2001

(65) Prior Publication Data

US 2002/0080693 A1 Jun. 27, 2002

(30) Foreign Application Priority Data

Dec. 21, 2000 (KR) ........................................ 2000-79734

(51) Int. Cl.⁷ ................................................ G11B 7/00
(52) U.S. Cl. ................................ 369/44.41; 369/44.27; 369/44.34
(58) Field of Search ......................... 369/44.11, 44.27, 369/44.28, 44.32, 44.34, 44.41, 44.42, 47.1, 53.1, 53.19, 53.45, 59.1, 59.14, 124.01

(56) References Cited

U.S. PATENT DOCUMENTS

| | | | | |
|---|---|---|---|---|
| 6,262,954 B1 | * | 7/2001 | Watabe | 369/44.34 |
| 6,317,396 B1 | * | 11/2001 | Kuribayashi | 369/44.35 |
| 6,345,020 B1 | * | 2/2002 | Cho et al. | 369/44.32 |
| 6,501,712 B1 | * | 12/2002 | Masuda et al. | 369/44.27 |

* cited by examiner

*Primary Examiner*—Muhammad Edun
(74) *Attorney, Agent, or Firm*—Staas & Halsey LLP

(57) ABSTRACT

At least part of a light beam reflected from an optical disc is divided into first through fourth light areas in directions corresponding to the radial and tangential directions of the disc, and first through fourth detection signals are output from the light areas. The first through fourth light areas are ordered counterclockwise or clockwise. A phase difference is obtained between a first sum signal obtained by summing the first and third detection signals and a second sum signal obtained by summing the second and fourth detection signals and first and second phase difference signals are output based upon the phase difference. The phase difference signals are summed to generate an optical recording/reproducing system monitoring signal for system adjustment even for high density optical discs, the monitoring signal being proportional to the degrees of a radial tilt, tangential tilt, a defocus, or a detrack.

21 Claims, 10 Drawing Sheets

RADIAL TILT

FIG. 3B

TANGENTIAL TILT

METHOD AND APPARATUS TO GENERATE A MONITORING SIGNAL FOR AN OPTICAL RECORDING/REPRODUCING SYSTEM

CROSS-REFERENCE TO RELATED APPLICATIONS

This application claims the benefit of Korean Application No. 2000-79734, filed Dec. 21, 2000, in the Korean Industrial Property Office, the disclosure of which is incorporated herein by reference.

BACKGROUND OF THE INVENTION

1. Field of the Invention

The present invention relates to a method and apparatus to generate a monitoring signal for an optical recording/reproducing system to monitor the state of the optical recording/reproducing system and to adjust the optical recording/reproducing system to an optimal state.

2. Description of the Related Art

Generally, at an initial state optical recording/reproducing systems are adjusted to an optimal state with respect to a radial tilt, tangential tilt, defocus and detrack. In order to adjust an initial system state, conventionally, an envelope signal of a radio frequency (RF) signal is used, which is the sum of signals output from an information signal recording/reproducing photodetector with a plurality of separate plates.

However, since a high density optical disc, such as a next generation DVD in the process of development and called a high-definition digital versatile disc (HD-DVD), has a relatively very small track pitch with respect to the size of an optical spot compared to a CD or DVD, a crosstalk component is mixed into the RF signal due to an adjacent track. Accordingly, it is difficult to detect the envelope of the RF signal.

Figure 1A:
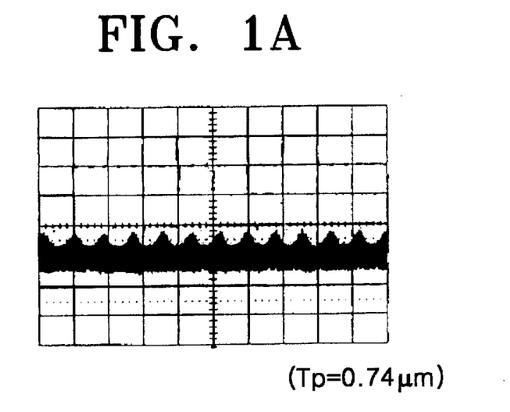
FIGS. 1A through 1C are graphs of changes in a radio frequency (RF) signal according to changes in an optical spot and track pitch.
Figure 1B:
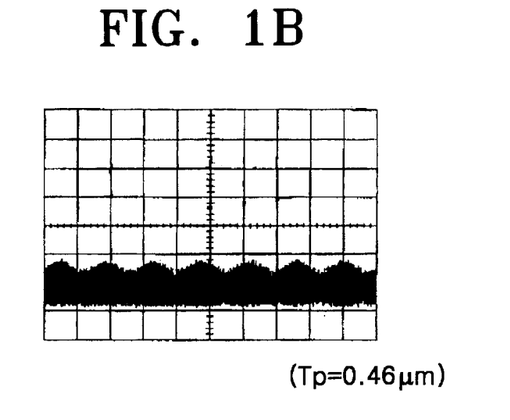
Figure 1C:
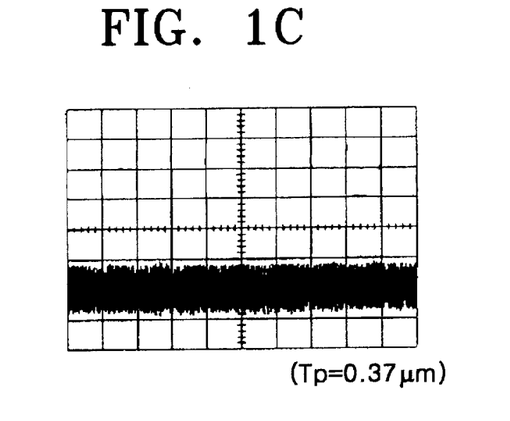

FIGS. 1A through 1C illustrate changes in an RF signal according to changes in an optical spot and track pitch and show an RF signal at a track pitch Tp of 0.74 µm (in the case of a DVD), 0.46 µm and 0.37 µm, respectively. The RF signal shown in FIGS. 1A through 1C was detected using light having a wavelength of 400 nm and an objective lens having a numerical aperture of 0.6. Here, a high density optical disc such as a next generation DVD (for example, a HD-DVD) will have a track pitch no greater than about 0.37 µm.

As is evident from FIGS. 1A through 1C, when a track pitch decreases with respect to an optical spot with a predetermined size, a crosstalk component mixed into an RF signal increases. As a result, the RF signal is degraded, and it becomes difficult to detect the envelope of the RF signal.

Accordingly, it is difficult to adjust an optical recording/reproducing system to an optimal initial state based on the envelope of an RF signal with a high density optical disc having a small track pitch with respect to an optical spot.

SUMMARY OF THE INVENTION

To solve the above problems, it is an object of the present invention to provide a method and apparatus to generate a monitoring signal for an optical recording/reproducing system to adjust the initial state of an optical recording/reproducing system to an optimal state even with respect to a high density optical disc having a small track pitch with respect to an optical spot.

Additional objects and advantages of the invention will be set forth in part in the description which follows and, in part, will be obvious from the description, or may be learned by practice of the invention.

Accordingly, to achieve the above and other objects of the invention, there is provided a method of generating an optical recording/reproducing system monitoring signal, by dividing at least part of a light beam reflected from a recording surface of a recording medium into first through fourth light areas in directions corresponding to radial and tangential directions of the recording medium, the first through fourth light areas being ordered counterclockwise or clockwise, outputting first through fourth detection signals from the first through fourth light areas, detecting a phase difference between a first sum signal obtained by summing the first and third detection signals and a second sum signal obtained by summing the second and fourth detection signals, outputting first and second phase difference signals based upon the detected phase difference, and summing the first and second phase difference signals to generate an optical recording/reproducing system monitoring signal.

Preferably, the method further includes low-pass filtering the first and second phase difference signals before summing.

To achieve the above and other objects of the invention, there is also provided an apparatus to generate an optical recording/reproducing system monitoring signal, including a photodetector including first through fourth light receiving areas for dividing at least part of a light beam reflected from a recording surface of a recording medium into first through fourth light areas in directions corresponding to radial and tangential directions of the recording medium, the first through fourth light areas being ordered counterclockwise or clockwise, a phase difference detector to compare a phase of a first sum signal obtained by summing first and third detection signals output from the first and third light receiving areas, respectively, with a phase of a second sum signal obtained by summing second and fourth detection signals output from the second and fourth light receiving areas to output first and second phase difference signals; and an adder to sum the first and second phase difference signals output from the phase difference detector to generate an optical recording/reproducing system monitoring signal.

Preferably, the apparatus further includes a low-pass filter to low-pass filter the first and second phase difference signals between an output terminal of the phase difference detector and an input terminal of the adder.

The first through fourth light receiving areas may be spaced out in at least one direction between the directions corresponding to the radial and tangential directions.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE PREFERRED EMBODIMENTS

Hereinafter, embodiments of the present invention will be described in detail with reference to the attached drawings where like reference numerals refer to the like elements throughout. The embodiments are described below to explain the present invention by referring to the figures and to more completely explain the present invention to anyone skilled in the art. The present invention is not restricted to the following embodiments, and many variations are possible within the spirit and scope of the present invention, the scope of which is defined in the claims and their equivalents. The embodiments of the present invention are provided to more completely explain the present invention to anyone skilled in the art.

The present invention obtains a signal to monitor the state of an optical recording/reproducing system by summing phase difference signals detected according to a differential phase detection (DPD) method. In particular, the present invention detects detection signals corresponding to states of the optical system to be adjusted by dividing a light beam into at least a number of light areas for each state. In other words, for example, the present invention detects first through fourth detection signals, which correspond to states of the optical system to be adjusted, with respect to first through fourth light areas of a light beam which has been reflected from a recording surface of a recording medium and passed through an objective lens, obtains first and second phase difference signals by detecting the phase difference between a first sum signal of the first and third detection signals and a second sum signal of the second and fourth detection signals, and sums the first and second phase difference signals, thereby obtaining a monitoring signal for an optical recording/reproducing system. To obtain a higher-quality monitoring signal, the first and second phase difference signals may be low-pass filtered before being summed. Here, the first through fourth light areas are at least a partial area of the light beam reflected from the recording surface of the recording medium, which is divided in a direction (referred to a R' direction) corresponding to the radial direction of the recording medium and a direction (referred to a T' direction) corresponding to the tangential direction thereof. The first through fourth light areas are ordered counterclockwise or clockwise. The first through fourth light areas may be spaced out in at least one direction of the R' and T' directions.

Accordingly, when an optical recording/reproducing system is designed to detect a tracking error signal according to the DPD method, an optical recording/reproducing system monitoring signal can be detected according to the present invention by simply providing an adder to sum phase difference signals output from a phase difference detector of a tracking error detection block of the optical recording/reproducing system.

Figure 2:
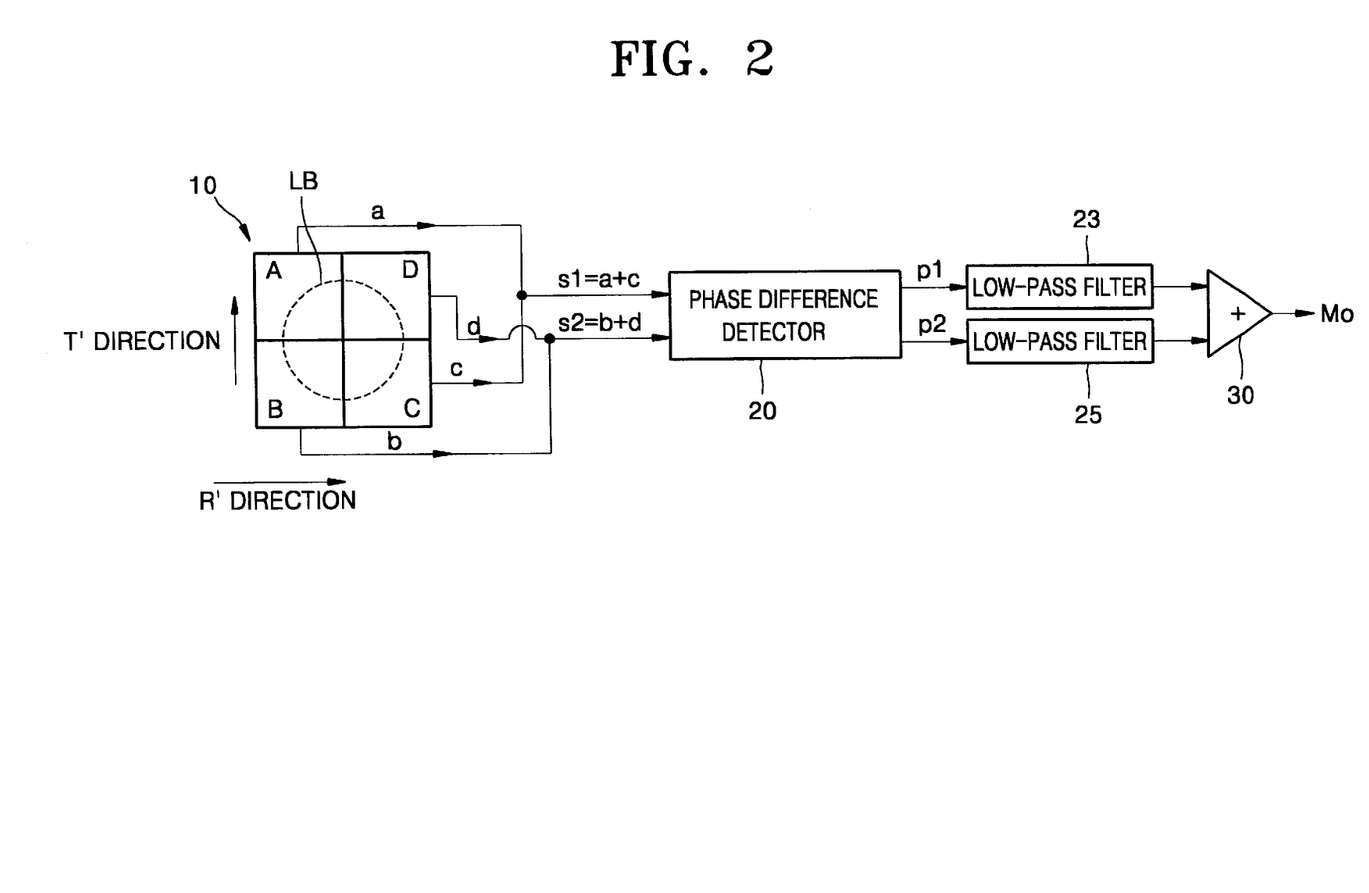
FIG. 2 is a schematic diagram of an apparatus to generate an optical recording/reproducing system monitoring signal according to an embodiment of the present invention.
Figure 3A:
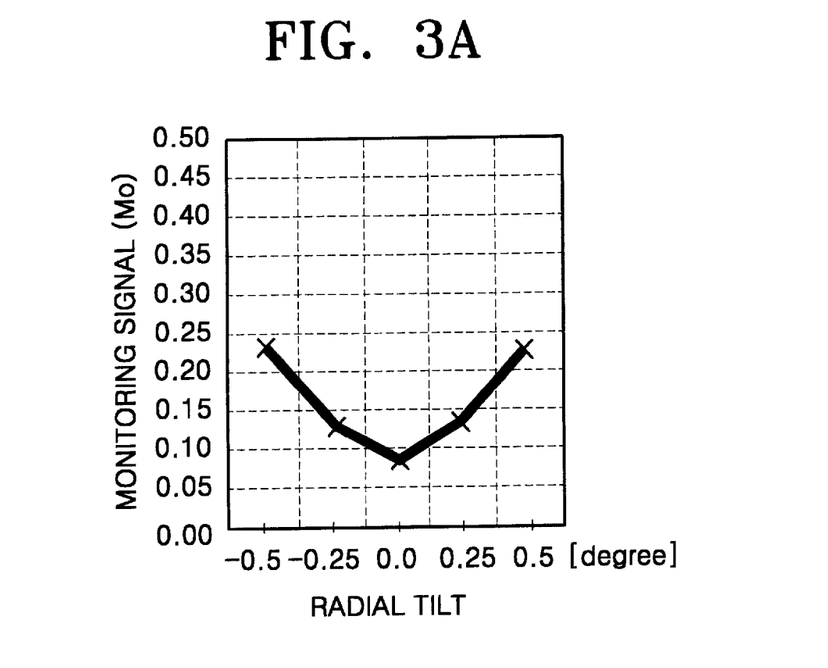
FIGS. 3A through 3D are graphs of changes in a monitoring signal, which is output from an optical recording/reproducing monitoring signal generating apparatus according to the present invention, according to a radial tilt, tangential tilt, defocus and detrack, respectively.
Figure 3B:
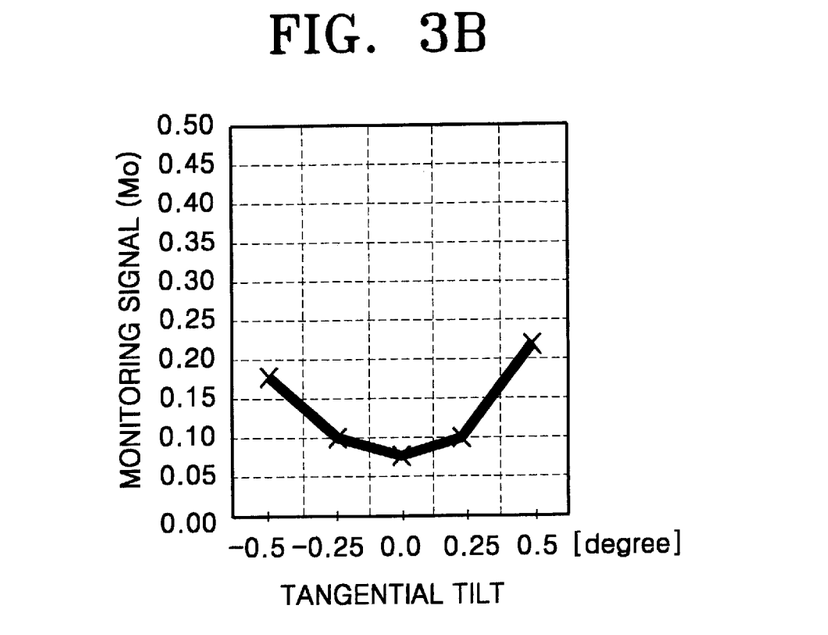
Figure 3C:
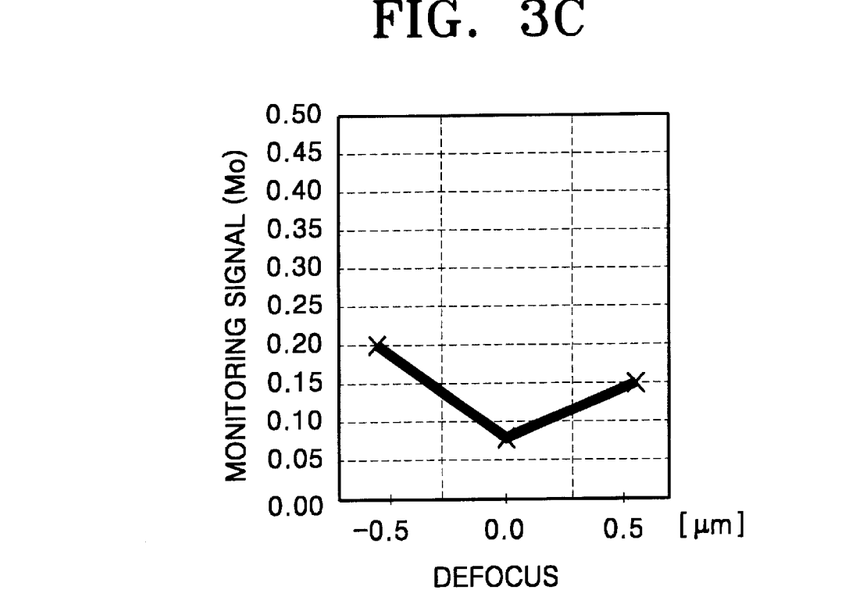
Figure 3D:
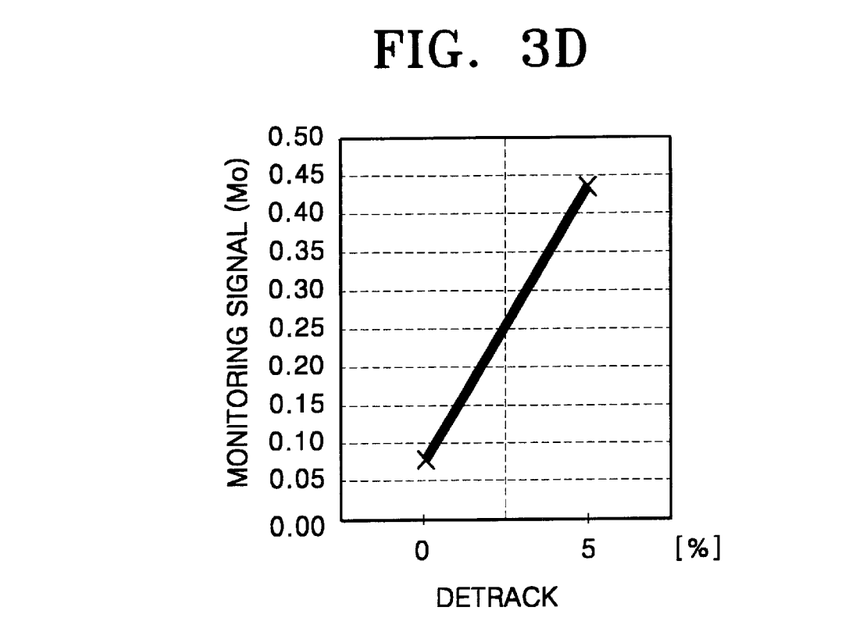

FIG. 2 is a schematic diagram of an optical recording/reproducing system monitoring signal generating apparatus according to an embodiment of the present invention. Referring to FIG. 2, the optical recording/reproducing system monitoring signal generating apparatus includes a photodetector 10 having first through fourth light receiving areas A, B, C and D, a phase difference detector 20 for comparing phase differences among the detection signals of the first through fourth light receiving areas A, B, C and D and outputting first and second phase difference signals p1 and p2, and an adder 30 for summing the first and second phase difference signals p1 and p2 to generate an optical recording/reproducing system monitoring signal Mo.

The photodetector 10 is connected to an optical pickup and can also detect an information reproduction signal, a focus error signal and/or a tracking error signal from a recording medium. The photodetector 10 receives a light beam (LB), which has been emitted from a light source, reflected from the recording surface of the recording medium and passed through an objective lens, and detects the above signals from the LB.

The photodetector 10 includes the first through fourth light receiving areas A, B, C and D formed by dividing the photodetector 10 into two areas in the R' direction and into two areas in the T' direction so that the photodetector 10 receives the first through fourth light areas of the LB and outputs first through fourth detection signals "a," "b," "c" and "d." The first through fourth light receiving areas A, B, C and D are ordered counterclockwise or clockwise.

The phase difference detector 20 compares the phase of a first sum signal s1(=a+c), which is obtained by summing the first and third detection signals "a" and "c" detected from the first and third light receiving areas A and C, with the phase of a second sum signal s2(=b+d), which is obtained by summing the second and fourth detection signals "b" and "d" detected from the second and fourth light receiving areas B and D, and outputs the first and second phase difference signals p1 and p2. For example, the phase difference detector 20 may be designed such that it outputs a first phase difference signal p1 when the phase of the first sum signal s1 leads the phase of the second sum signal s2 and outputs a second phase difference signal p2 when the phase of the second sum signal s2 leads the phase of the first sum signal s1.

The adder 30 sums the first and second phase difference signals p1 and p2 received from the phase difference detector 20 and outputs a monitoring signal Mo with respect to the state of an optical recording/reproducing system.

It is preferable that low-pass filters 23 and 25 that only pass low frequency components of the first and second phase difference signals p1 and p2 are provided between the output terminals of the phase difference detector 20 and the input terminals of the adder 30.

When the optical recording/reproducing system employing a monitoring signal generation apparatus according to the present invention has a structure of detecting a tracking error signal according to the DPD method, the photodetector 10, the phase difference detector 20 and the low-pass filters 23 and 25 may be included in a tracking error signal detection apparatus. The tracking error signal detection apparatus further includes a subtractor (not shown) for performing a subtraction on the first and second phase difference signals p1 and p2 to output a tracking error signal.

The detected detection signals correspond to states of the optical system to be adjusted, such as a radial tilt, a tangential tilt, a defocus and a detrack. Therefore, a monitoring signal Mo output from an optical recording/reproducing system monitoring signal generating apparatus according to the present invention has characteristics as shown in FIGS. 3A through 3D with respect to the radial tilt, the tangential tilt, the defocus and the detrack. FIGS. 3A through 3D are graphs of changes in a monitoring signal, which is output from an optical recording/reproducing monitoring signal generating apparatus according to the present invention, according to a radial tilt, tangential tilt, defocus and detrack, respectively. The monitoring signal Mo shown in FIGS. 3A through 3D was obtained by condensing light having a wavelength of 405 nm on a recording medium having a track pitch of 0.37 µm and a minimum mark length of 0.25 µm through an objective lens having a numerical aperture of 0.6, and then detecting light reflected from the recording medium according to the present invention.

As is evident from FIGS. 3A through 3D, the monitoring signal Mo is detected at a minimum when the radial tilt, tangential tilt, defocus and detrack are zero. When the monitor signal Mo is at a minimum, an optical recording/reproducing system is in an optimal state. When there is any radial tilt, tangential tilt, defocus or detrack, the magnitude of the monitoring signal Mo increases proportionally to the degree thereof.

Therefore, the initial state of an optical recording/reproducing system can be adjusted to an optimum using a monitoring signal Mo detected by a monitoring signal generating apparatus according to the present invention. In other words, when it is assumed that a detection signal with respect to at least one among the radial tilt, tangential tilt, defocus, and detrack exists in an optical recording/reproducing system employing a monitoring signal generating apparatus according to the present invention, the optical recording/reproducing system can be adjusted to an optimal state by eliminating the initial offset of the detection signal using a monitoring signal Mo detected by an apparatus and method according to the present invention.

For example, the initial state of an optical recording/reproducing system with respect to a radial tilt can be adjusted to an optimal state using a monitoring signal Mo according to the present invention as follows. Based on the fact that the monitoring signal Mo is a minimum when the radial tilt is zero, the monitoring signal Mo is monitored to detect a minimum, and a radial tilt detection signal is made to be zero when the monitoring signal Mo is the minimum, thereby eliminating the offset of the radial tilt detection signal. By eliminating the offset of the radial tilt detection signal, the optical recording/reproducing system is adjusted to an optimal state with respect to the radial tilt. The optical recording/reproducing system can be adjusted to an optimal state with respect to a tangential tilt, defocus, and detrack in the same manner.

FIG. 2 shows an embodiment where an optical recording/reproducing system monitoring signal generating apparatus according to the present invention includes the photodetector 10 having a division structure, but it is apparent that a monitoring signal Mo to adjust an optical recording/reproducing system to an optimal state can be detected even if the structure of the photodetector 10 is changed.

Figure 4:
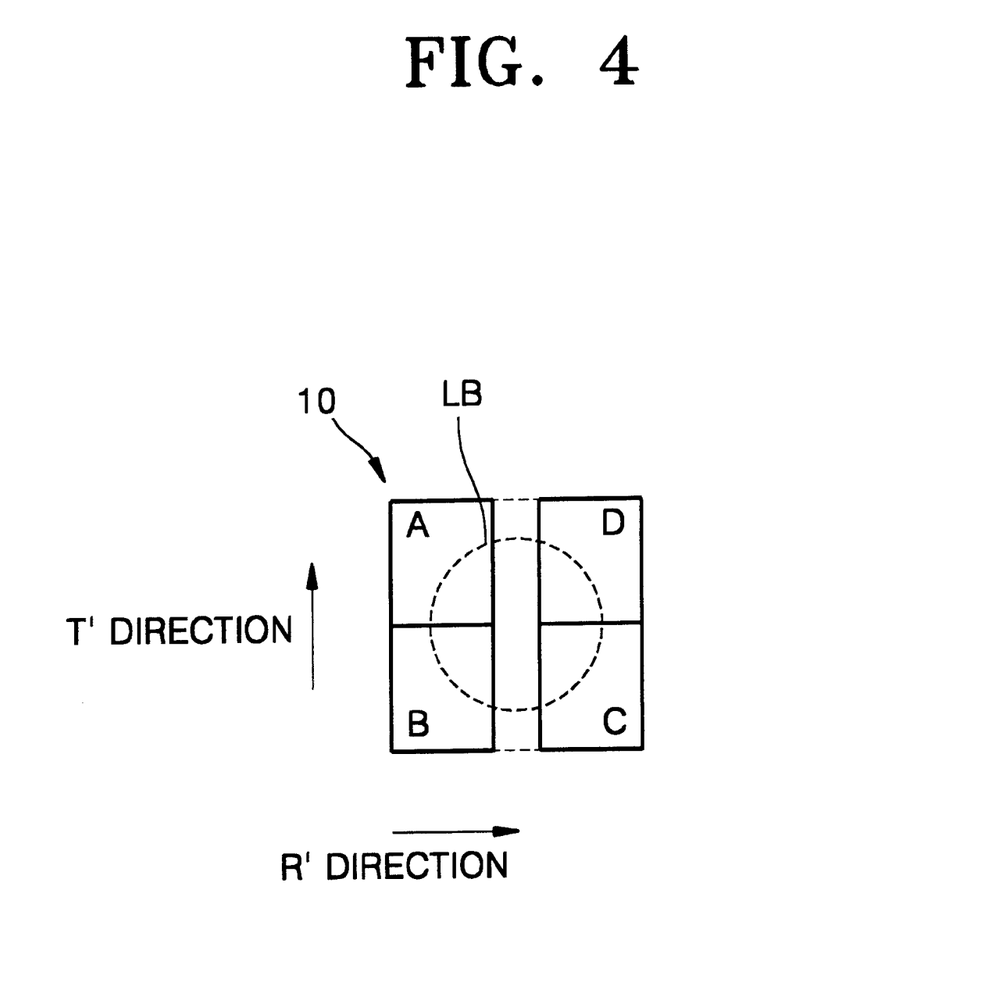
FIG. 4 is a diagram of a second embodiment of the photodetector shown in FIG. 2.
Figure 5A:
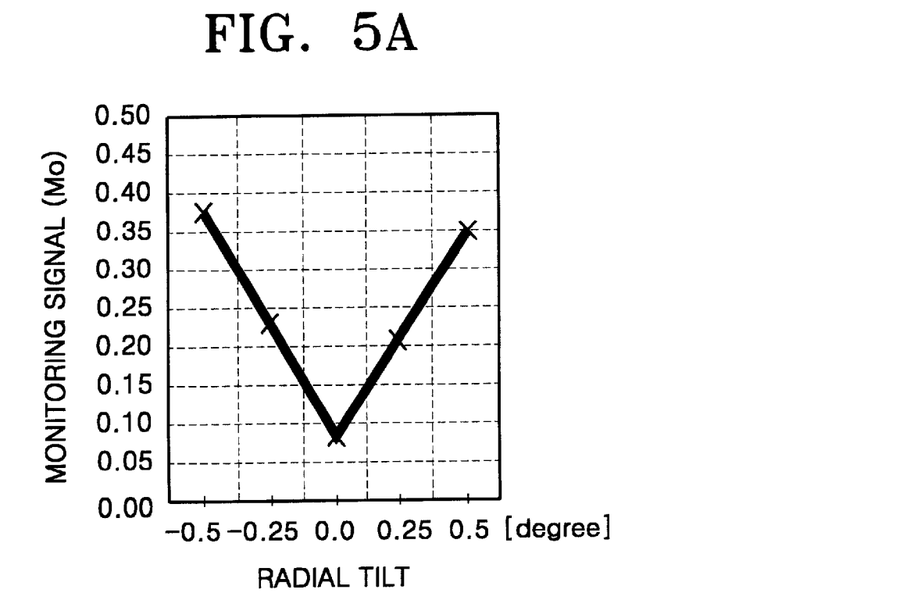
FIGS. 5A through 5D are graphs of changes in a monitoring signal, which is output from an optical recording/reproducing monitoring signal generating apparatus employing the photodetector of FIG. 4 according to the present invention, according to a radial tilt, tangential tilt, defocus and detrack, respectively.
Figure 5B:
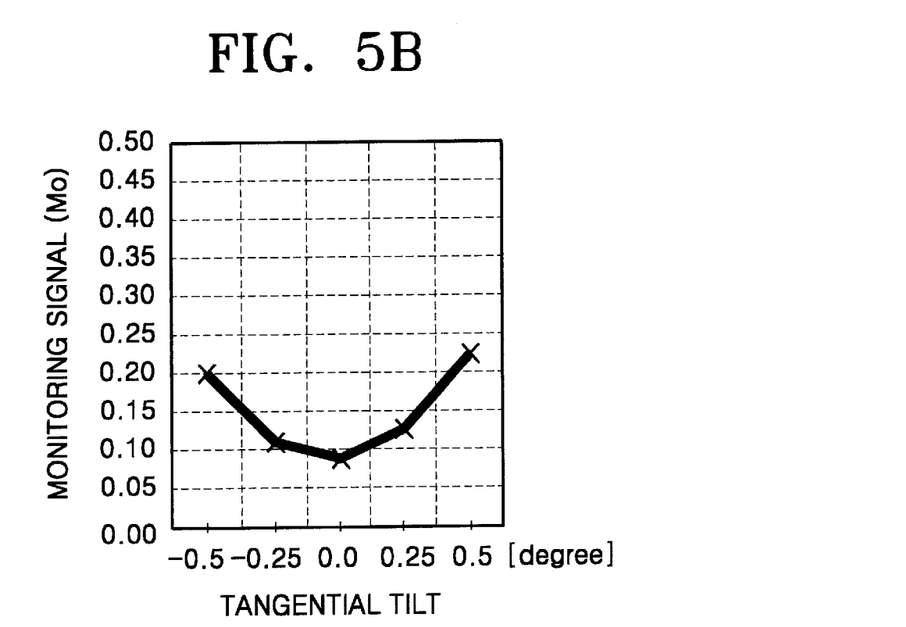
Figure 5C:
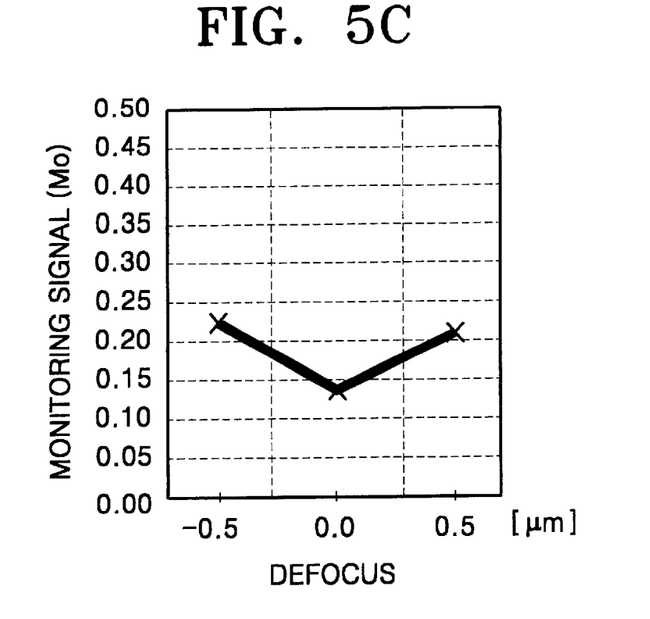
Figure 5D:
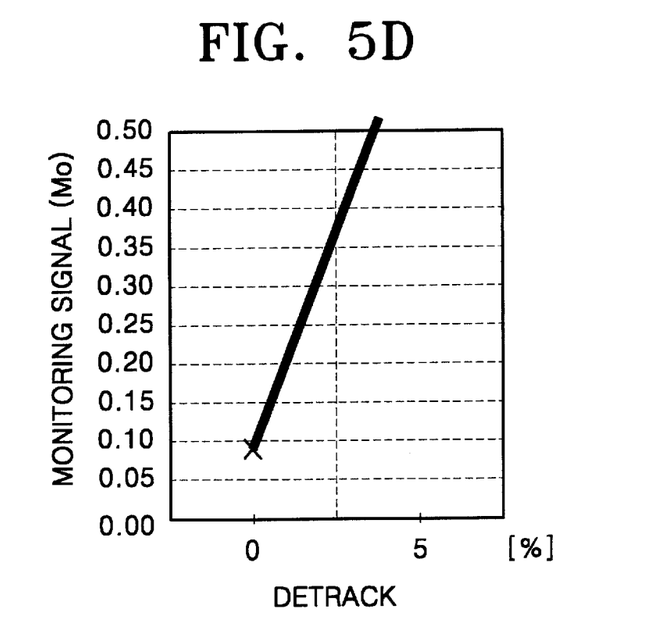

In other words, as shown in FIG. 4, the first through fourth light receiving areas A, B, C and D may be spaced out in the R' direction. When the photodetector 10 having a spaced structure, as shown in FIG. 4, is used, a monitoring signal Mo detected by a monitoring signal generating apparatus according to the present invention changes according to a radial tilt, tangential tilt, defocus and detrack, as shown in FIGS. 5A through 5D.

Figure 6:
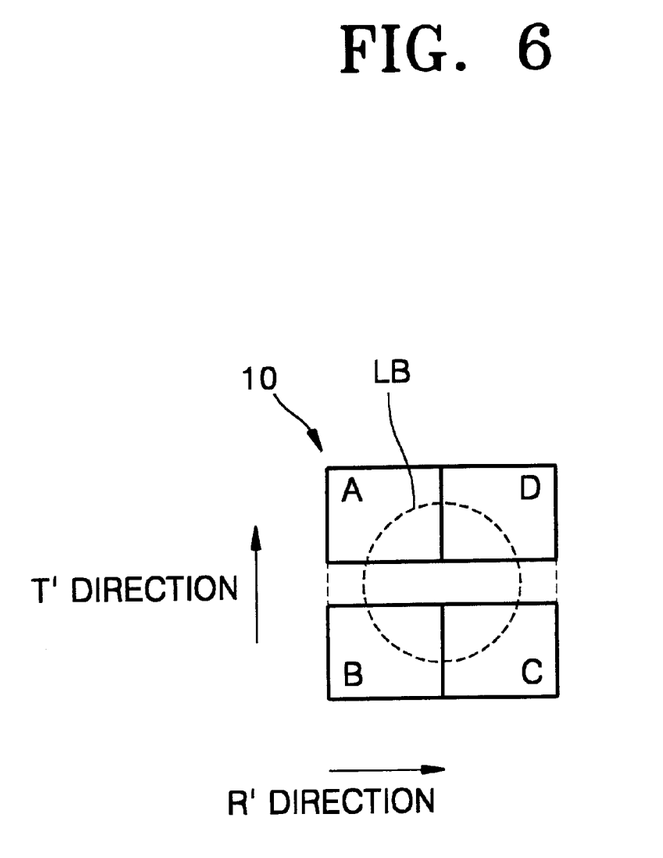
FIG. 6 is a diagram of a third embodiment of the photodetector shown in FIG. 2.
Figure 7A:
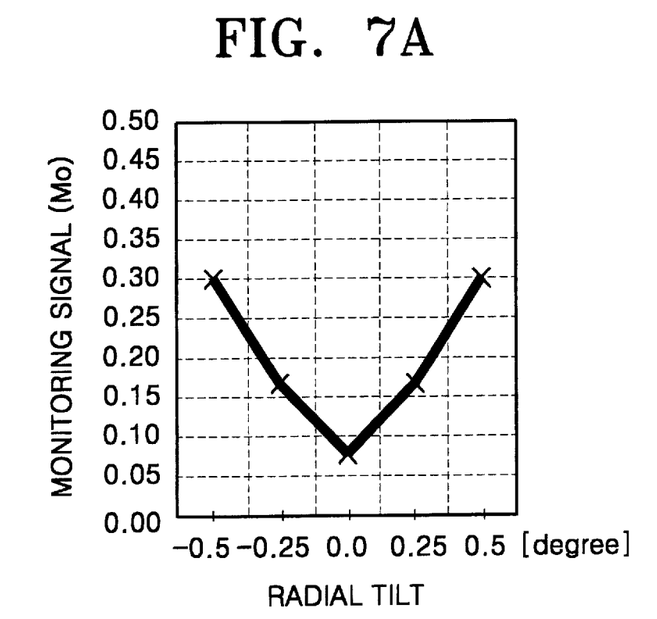
FIGS. 7A through 7D are graphs of changes in a monitoring signal, which is output from an optical recording/reproducing monitoring signal generating apparatus employing the photodetector of FIG. 6 according to the present invention, according to a radial tilt, tangential tilt, defocus and detrack, respectively.
Figure 7B:
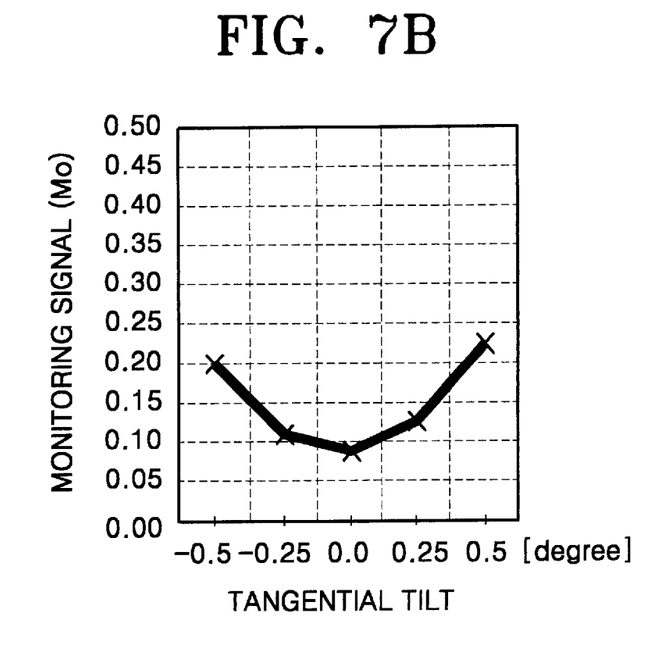
Figure 7C:
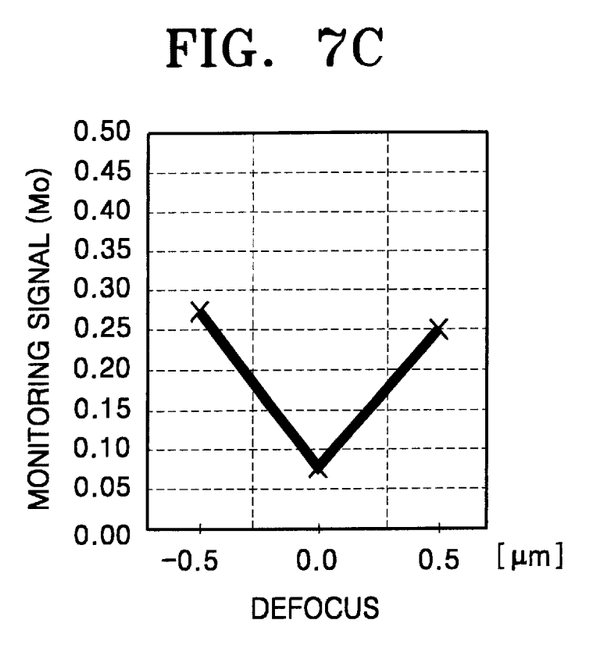
Figure 7D:
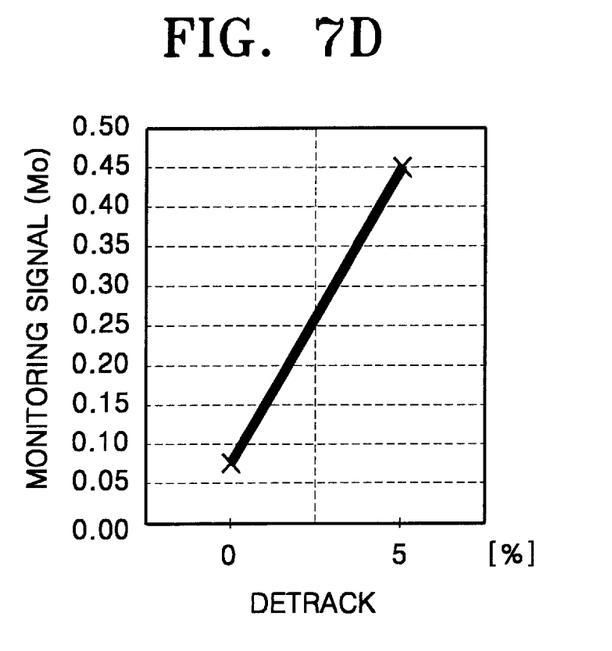

When the photodetector 10 has a structure in which the first through fourth light receiving areas A, B, C and D are spaced out in the T' direction, as shown in FIG. 6, a monitoring signal Mo detected by a monitoring signal generating apparatus according to the present invention changes according to a radial tilt, tangential tilt, defocus and detrack, as shown in FIGS. 7A through 7D.

Alternatively, even when the photodetector 10 has a structure in which the structures of FIGS. 4 and 6 are combined, that is, a structure in which the first through fourth light receiving areas A, B, C and D are spaced out in directions corresponding to the tangential and radial directions of a recording medium, it is apparent that a monitoring signal Mo having characteristics similar to those in the above structures can be detected.

As is evident from FIGS. 5A through 5D and 7A through 7D, when the photodetector 10 has a structure in which the first through fourth light receiving areas A, B, C and D are spaced out in at least one direction between directions corresponding to the tangential and radial direction of a recording medium, a monitoring signal generating apparatus according to the present invention can also detect a monitoring signal Mo proportional to the degrees of radial tilt, tangential tilt, defocus, and detrack.

Here, the photodetector 10 according to the present invention may be divided into 8 or 16 areas, taking into account a spaced structure, as shown in FIGS. 4, and 6 to detect an information reproduction signal and a tracking error signal, so that a monitoring signal Mo can be detected using the detection signals from only some light receiving areas.

An optical recording/reproducing system monitoring signal generating apparatus according to the present invention can detect a monitoring signal to adjust an optical recording/reproducing system to an optimal state during off-track as well as on-track. In addition, an optical recording/reproducing system monitoring signal generating apparatus according to the present invention can detect a monitoring signal with respect to optical discs with marks as well as optical discs with pits. In other words, the present invention can generate an optical recording/reproducing system monitoring signal regardless of the type of optical disc.

According to the present invention, even with respect to high density optical discs such as next generation DVDs, an optical recording/reproducing system monitoring signal proportional to the degrees of a radial tilt, tangential tilt, defocus, and detrack can be detected by summing phase difference detection signals detected by a DPD method. Therefore, the initial state of an optical recording/reproducing system can be adjusted to an optimal state even with respect to high density optical discs such as next generation DVDs, using a monitoring signal detected by a monitoring signal generating apparatus and method according to the present invention.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method of generating an optical recording/reproducing system monitoring signal, comprising:

dividing at least part of a light beam reflected from a recording surface of a recording medium into first through fourth light areas in directions corresponding to radial and tangential directions of the recording medium, the first through fourth light areas being ordered counterclockwise or clockwise;

outputting first through fourth detection signals from the first through fourth light areas;

detecting a phase difference between a first sum signal obtained by summing the first and third detection signals and a second sum signal obtained by summing the second and fourth detection signals;

outputting first and second phase difference signals based upon the detected phase difference; and summing the first and second phase difference signals to generate an optical recording/reproducing system monitoring signal.

2. The method of claim 1, further comprising low-pass filtering the first and second phase difference signals before the summing.

3. The method of claim 2, wherein the first through fourth light areas are spaced out a predetermined distance in at least one direction between the directions corresponding to the radial and tangential directions.

4. The method of claim 1, wherein the first through fourth light areas are spaced out a predetermined distance in at least one direction between the directions corresponding to the radial and tangential directions.

5. An apparatus to generate an optical recording/reproducing system monitoring signal, comprising:

a photodetector including first through fourth light receiving areas to divide at least part of a light beam reflected from a recording surface of a recording medium into first through fourth light areas in directions corresponding to radial and tangential directions of the recording medium, the first through fourth light areas being ordered counterclockwise or clockwise;

a phase difference detector to compare phase of a first sum signal obtained by summing first and third detection signals output from the first and third light receiving areas, respectively, with phase of a second sum signal obtained by summing second and fourth detection signals output from the second and fourth light receiving areas to output first and second phase difference signals based upon the comparing of the phases; and an adder to sum the first and second phase difference signals output from the phase difference detector to generate an optical recording/reproducing system monitoring signal.

6. The apparatus of claim 5, further comprising a low-pass filter to low-pass filter the first and second phase difference signals between an output terminal of the phase difference detector and an input terminal of the adder.

7. The apparatus of claim 6, wherein the first through fourth light receiving areas are spaced out in at least one direction between the directions corresponding to the radial and tangential directions.

8. The apparatus of claim 5, wherein the first through fourth light receiving areas are spaced out in at least one direction between the directions corresponding to the radial and tangential directions.

9. A method of gene rating a monitoring signal for an optical recording/reproducing system, comprising:

receiving a light beam reflected from an optical disc;

detecting phase difference signals of detection signals from the light beam according to a differential phase detection method; and adding the phase difference signals to output the monitoring signal.

10. The method of claim 9, further comprising dividing the light beam into at least four light areas to detect the detection signals and further detecting from the phase difference signals an information reproduction signal, a focus error signal and/or a tracking error signal.

11. The method of claim 9, further comprising:

adjusting at least one state of the optical recording/reproduction system according to the monitoring signal, wherein the monitoring signal changes according to the at least one state.

12. The method of claim 11, wherein the states comprise a radial tilt, a tangential tilt, a defocus, or a detrack.

13. The method of claim 11, further comprising:

monitoring the monitoring signal for a minimum and adjusting the one of the states to remove an offset for the one state based upon the minimum.

14. The method of claim 9, wherein the optical disc has characteristics of a small track pitch with respect to size of an optical spot and the method further comprises:

dividing the light beam into at least four light areas to detect the detection signals; and adjusting states of the optical recording/reproduction system according to the monitoring signal, wherein the monitoring signal changes according to the states.

15. A system to generate an optical recording/reproducing monitoring signal used by an optical recording/reproducing system, comprising:

a photodetector to receive a light beam reflected from an optical disc;

a phase difference detector to detect phase difference signals of detection signals from the light beam according to a differential phase detection method; and an adder to add the phase difference signals to output the monitoring signal.

16. The system of claim 15, wherein the photodetector further divides the light beam into at least four light areas to detect the detection signals and the system further detects from the phase difference signals an information reproduction signal, a focus error signal and/or a tracking error signal.

17. The system of claim 16, wherein the optical recording/reproducing system monitors the monitoring signal for a minimum and adjusts one of the states to remove an offset for the one state based upon the minimum.

18. The system of claim 15, wherein the optical recording/reproducing system adjusts at least one state of the optical recording/reproducing system according to the monitoring signal, which reflects changes of the least one state comprising a radial tilt, a tangential tilt, a defocus, or a detrack.

19. The system of claim 15, wherein the optical disc has characteristics of a small track pitch with respect to size of an optical spot;

the photodetctor divides the light beam into at least four light areas to detect the detection signals; and the optical recording/reproducing system adjusts states of the system according to the monitoring signal, which reflects changes of the states comprising a radial tilt, a tangential tilt, a defocus, or a detrack.

20. A method of generating a monitoring signal for an optical recording/reproducing system, comprising:

receiving a light beam reflected from an optical disc;

detecting phase difference signals of detection signals from the light beam according to a differential phase detection method; and adding the phase difference signals to output a monitoring signal proportional to degrees of a radial tilt, a tangential tilt, a defocus, or a detrack of the optical recording/reproduction system.

21. A system to generate an optical recording/reproducing monitoring signal used by an optical recording/reproducing system, comprising:

a photodetector to receive a light beam reflected from an optical disc;

a phase difference detector to detect phase difference signals of detection signals from the light beam according to a differential phase detection method; and an adder to add the phase difference signals to output a monitoring signal proportional to degrees of a radial tilt, a tangential tilt, a defocus, or a detrack of the optical recording/reproduction system.

* * * * *

UNITED STATES PATENT AND TRADEMARK OFFICE
CERTIFICATE OF CORRECTION

PATENT NO. : 6,801,486 B2
DATED : October 5, 2004
INVENTOR(S) : Byung-in Ma et al.

It is certified that error appears in the above-identified patent and that said Letters Patent is hereby corrected as shown below:

Column 7,
Line 65, change "gene rating" to -- generating --.

Signed and Sealed this

Twenty-sixth Day of April, 2005

JON W. DUDAS
*Director of the United States Patent and Trademark Office*